(12) United States Patent
Ponath et al.

(10) Patent No.: US 11,754,455 B2
(45) Date of Patent: Sep. 12, 2023

(54) PRESSURE MEASURING DEVICE WITH FREE-STANDING CARRIER

(71) Applicant: Endress+Hauser SE+Co. KG, Maulburg (DE)

(72) Inventors: Nils Ponath, Lörrach (DE); Andreas Rossberg, Bad Säckingen (DE); Elke Schmidt, Bad Säckingen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 301 days.

(21) Appl. No.: 17/277,864

(22) PCT Filed: Sep. 5, 2019

(86) PCT No.: PCT/EP2019/073738
§ 371 (c)(1),
(2) Date: Mar. 19, 2021

(87) PCT Pub. No.: WO2020/057995
PCT Pub. Date: Mar. 26, 2020

(65) Prior Publication Data
US 2021/0348980 A1    Nov. 11, 2021

(30) Foreign Application Priority Data
Sep. 19, 2018  (DE) .................. 10 2018 123 041.9

(51) Int. Cl.
G01L 19/04  (2006.01)
G01L 9/00   (2006.01)
G01L 19/14  (2006.01)

(52) U.S. Cl.
CPC ............ *G01L 19/04* (2013.01); *G01L 9/0075* (2013.01); *G01L 19/147* (2013.01)

(58) Field of Classification Search
None
See application file for complete search history.

(56) References Cited

U.S. PATENT DOCUMENTS 4,399,707 A     8/1983  Wamstad
2002/0023499 A1  2/2002  Boehler et al.
(Continued)

FOREIGN PATENT DOCUMENTS

CN  101512314 A  8/2009
CN  105829853 A  8/2016
(Continued)

*Primary Examiner* — Peter J Macchiarolo
*Assistant Examiner* — Jermaine L Jenkins
(74) *Attorney, Agent, or Firm* — Christopher R. Powers; Endress+Hauser (USA) Holding, Inc.

(57) ABSTRACT

A pressure measuring device includes a ceramic pressure sensor and a process connection, the pressure sensor including a measuring membrane. The pressure measuring device further includes a carrier made of titanium and having a free-standing tubular carrier region running parallel to the surface normal onto the measuring membrane and having an end region adjacent the process connection connected to the process connection and an end region opposite the process connection to which the pressure sensor is fastened by a jointing that connects an outer edge of a front face of the pressure sensor to the end region of the carrier opposite the process connection and carries the pressure sensor.

15 Claims, 2 Drawing Sheets

(56) References Cited

U.S. PATENT DOCUMENTS

2018/0292282 A1\* 10/2018 Rossberg .............. G01L 19/145
2021/0255048 A1\* 8/2021 Niimura ................ G01L 9/0047

FOREIGN PATENT DOCUMENTS

| | | | |
|---|---:|---|---|
| CN | 108369149 | A | 8/2018 |
| DE | 225501 | A1 | 7/1985 |
| DE | 3818458 | A1 | 12/1989 |
| DE | 10334854 | A1 | 3/2005 |
| DE | 102011004722 | A1 | 8/2012 |
| DE | 102011004729 | A1 | 8/2012 |
| DE | 102014106704 | A1 | 11/2015 |
| DE | 102015104365 | A1 | 9/2016 |
| DE | 102016204511 | B3 | 3/2017 |
| DE | 102016105001 | A1 | 9/2017 |
| DE | 102018108744 | A1 | 10/2019 |
| EP | 0735353 | A1 | 10/1996 |
| EP | 0759547 | B1 | 2/1997 |
| EP | 2860505 | A1 | 4/2015 |

\* cited by examiner

PRESSURE MEASURING DEVICE WITH FREE-STANDING CARRIER

CROSS-REFERENCE TO RELATED APPLICATIONS

The present application is related to and claims the priority benefit of German Patent Application No. 10 2018 123 041.9, filed on Sep. 19, 2018, and International Patent Application No. PCT/EP2019/073738, filed on Sep. 5, 2019, the entire contents of which are incorporated herein by reference.

TECHNICAL FIELD

The present disclosure relates to pressure measuring devices having a ceramic pressure sensor and a process connection by means of which the pressure measuring device can be mounted on a connection complementary thereto and/or can be connected to a connection of a differential pressure line complementary thereto, and to methods for producing such pressure measuring devices.

BACKGROUND

Pressure measuring devices of the type mentioned at the outset are used in industrial measuring technology for measuring pressures.

In pressure measuring devices of the type mentioned at the outset, today the ceramic pressure sensor is usually attached by means of a clamping device in which an outer edge of the pressure sensor is clamped in the axial direction, i.e., running parallel to a surface normal to the measuring membrane.

These clamping devices usually comprise a sensor housing including a substantially cylindrical housing wall, which surrounds the pressure sensor on the outside on all sides and on which a radially inwardly extending shoulder is integrally formed at the end. Together with a counter bearing inserted into the sensor housing, this shoulder forms the clamping device, in which the edge of the pressure sensor is clamped in such a way that its measuring membrane can be acted upon by the pressure to be measured through an opening surrounded by the shoulder on the outside on all sides. In addition, these pressure measuring devices comprise a sealing device, such as an O-ring made of an elastomer, which is clamped between an outer edge of the measuring membrane and the shoulder and which seals a housing interior with respect to the opening used for pressurization.

However, clamping devices necessarily exert forces on the pressure sensor. These forces are used, in particular, to ensure the attachment of the pressure sensor and the sealing effect of the sealing device. In particular due to the different coefficients of thermal expansion of the sensor housing, which is generally made of stainless steel, and of the ceramic pressure sensor, these forces can change as a function of the temperature, and optionally also as a function of the pressure acting on the measuring membrane.

It is known to reduce adverse effects of the clamping device on the achievable measuring accuracy by using, for clamping, an element that is elastic in the axial direction and that is used to compensate for changes in the clamping forces attributable to pressure and/or temperature changes. Furthermore, a sealing device described in DE 103 34 854 A1 can be used to reduce the adverse effects of the clamping device. This comprises a ceramic decoupling ring, which is arranged between the shoulder and the outer edge of the measuring membrane and on the end face of which facing the pressure sensor and the end face of which facing the shoulder, respectively, a flat gasket made of polytetrafluoroethylene (PTFE) is arranged in each case. This reduces forces acting on the measuring membrane in the radial direction, which otherwise would lead to changes in the pressure-dependent deformability of the measuring membrane.

These measures ensure that correspondingly designed pressure measuring devices have a high measuring accuracy in a comparatively large pressure measuring range.

Sealing materials, such as elastomers or thermoplastics, which can be used to seal the interior of the housing, however, are not diffusion-tight and age over time. The latter is especially problematic with regard to the measurement of very small pressures, such as, for example, pressures below the atmospheric pressure of one bar, since here even very small changes in the clamping forces have a disadvantageous effect on the measuring accuracy, and the tightness of the seal effectuated by the sealing device has to satisfy very high requirements.

The problems attributable to aging and the lack of diffusion tightness of sealing materials can be countered, for example, in the manner described in EP 2 860 505 A1. A pressure measuring device is described there, including a ceramic pressure sensor, and a process connection by means of which the pressure measuring device can be mounted on a connection complementary thereto and/or can be connected to a connection of a differential pressure line complementary thereto, the pressure sensor of which comprises a measuring membrane and is attached in such a way that its measuring membrane can be subjected to a pressure to be measured.

In this pressure measuring device, the process connection is made of titanium and comprises a recess in which the pressure sensor is attached by means of an attachment system. The process connection is welded substantially flush with its front into a flange, by means of which the pressure measuring device can be mounted at a place of use. The attachment system comprises a ceramic ring connected to an outer membrane edge of the measuring membrane by means of glass soldering or brazing. This ceramic ring is connected to a metal ring made of titanium, which in turn is connected to the process connection by means of a welded joint extending circumferentially in an annular manner along its outer edge. According to a first variant, the metal ring is designed as a ring which surrounds the ceramic ring on the outside on all sides and is shrunk onto the ceramic ring. According to a second variant, the metal ring is designed as an annular disk-shaped disk connected by means of brazing to an end face of the ceramic ring which faces away from the measuring membrane. In both variants, the attachment system forms an outer-side boundary of an opening which is used to pressurize the measuring membrane and which is sealed in a diffusion-tight manner with respect to the interior of the recess by the soldering between the membrane edge and the ceramic ring and the connection between the metal ring and the ceramic ring.

A silver-based solder, which preferably contains copper and titanium, is used to produce the brazing. In connection with the brazing between the ceramic ring and the metal ring, it is mentioned in this regard that a titanium content in the solder influences the connection to the ceramic and particularly good results can be achieved with a titanium content of 3% to 5%. These brazings are thus active brazings created by means of an active brazing solder comprising titanium as the active component.

Active brazing solders are characterized in that their active component reacts with the ceramic during active brazing. As a result of a reduction of the ceramic, a mechanically high-strength chemical bond is produced between the ceramic and the active brazing solder. Active brazing solders offer the advantage that, due to the active component contained therein, they are able to wet ceramic components and enable direct soldering of ceramic components, without prior metalization of the ceramic. However, it is disadvantageous that active brazing solders have a comparatively high melting temperature, and thus have to be processed at a comparatively high joining temperature. A further disadvantage is that the active component makes the brazing process more difficult to control.

As can be seen from the figures of EP 2 860 505 A1, the pressure sensor is supported in the recess on the rear side, that is to say on its rear side facing away from the measuring membrane, by the process connection, and is connected to the process connection on its front side, located opposite the rear side, by way of the attachment system in a mechanically comparatively rigid manner. Titanium and ceramic have coefficients of thermal expansion that are very similar to each other. Nevertheless, in the case of the sensor attachment described in EP 2 860 505 A1, it cannot be excluded that thermomechanical stresses, acting in the radial direction, are transmitted to the measuring membrane by way of the rigid connection between the measuring membrane and the process connection, which runs substantially in the radial direction, i.e. perpendicularly to the surface normal to the measuring membrane and exists via the attachment system. These stresses can lead to the pressure-dependent deformability of the measuring membrane changing as a function of the temperature, which in turn results in a measurement error dependent on the temperature.

In addition, the process connection made of titanium represents a special design, which is considerably more expensive than standard process connections used in large quantities in industrial measuring technology, which are typically made of stainless steel which is very cost-effective in comparison with titanium. These costs would be increased even further if the flange were also made of titanium. If a flange made of stainless steel were used instead, temperature-dependent thermomechanical stresses would arise, due to the distinctly different coefficients of thermal expansion of titanium and stainless steel, which are transmitted to the measuring membrane by way of the attachment system.

SUMMARY

It is an object of the invention to provide a pressure measuring device of the type mentioned at the outset which can be produced cost-effectively and with which small pressures, such as pressures of less than or equal to one bar, can be determined with a comparatively high measuring accuracy.

To achieve this object, the invention comprises a pressure measuring device comprising
  a ceramic pressure sensor, and
  a process connection by means of which the pressure measuring device can be mounted on a connection complementary thereto and/or can be connected to a connection of a differential pressure line complementary thereto,
  the pressure sensor of which comprises a measuring membrane and is attached in such a way that its measuring membrane can be subjected to a pressure to be measured,
characterized in that
  the pressure measuring device comprises a carrier made of titanium,
  the carrier comprises a free-standing tubular carrier region running parallel to the surface normal to the measuring membrane,
  the carrier comprises an end region facing the process connection and connected to the process connection, and
  the carrier comprises an end region facing away from the process connection, to which the pressure sensor is attached by means of a joint, which connects an outer edge of an end face of the pressure sensor to the end region of the carrier facing away from the process connection and which carries the pressure sensor.

Pressure measuring devices according to the invention offer the advantage that the pressure sensor is attached in the pressure measuring device without the use of a clamping device and without the use of elastomers or thermoplastics. A pressure-resistant, diffusion-tight seal is provided via the joint between the carrier and the pressure sensor.

A further advantage is that, as a result of the free-standing tubular carrier region running parallel to the surface normal to the measuring membrane, thermomechanical decoupling is provided between the process connection and the pressure sensor, which protects the pressure sensor from thermomechanical stresses transmittable thereon and attributable to the different coefficients of thermal expansion of the process connection and the carrier. In combination with the free-standing mounting of the carrier on the process connection, this offers the advantage that a standard process connection made of a stainless steel can be used as the process connection, without the achievable measuring accuracy decisively worsening as a result. Accordingly, pressure measuring devices according to the invention can be produced considerably more cost-effectively than pressure measuring devices whose process connection is configured as a special design made of titanium.

A further advantage is that titanium has a coefficient of thermal expansion that is very well adapted to the coefficient of thermal expansion of the ceramic of the pressure sensor. Accordingly, thermomechanical stresses that act on the pressure sensor and are attributable to the coefficients of thermal expansion of the carrier and the pressure sensor are very low, which has a positive effect on the achievable measuring accuracy.

A first variant is characterized in that the carrier is designed as a tube which is arranged in a free-standing manner on the process connection and comprises the tubular carrier region and the end region of which located opposite the process connection is connected by means of the joint to an outer edge of the front end face of the pressure sensor formed by the measuring membrane.

A second variant is characterized in that the measuring membrane is connected to a main body of the pressure sensor, enclosing a pressure chamber, the end region of the carrier facing away from the process connection has a radially inwardly extending shoulder that, at the end, adjoins the tubular carrier region, and an outer edge of the rear end face of the pressure sensor formed by the main body is connected by means of the joint to an inner edge region of the inner side of the shoulder which faces the process connection, the inner edge region being spaced apart from the tubular carrier region.

A development of the second variant is characterized in that in a direction running parallel to a surface normal to the measuring membrane, the carrier region has a length which is greater than or equal to a structural height which the pressure sensor has in a direction running parallel to the surface normal to the measuring membrane.

A first refinement of pressure measuring devices according to the invention is characterized in that the process connection has a pressure transmission path that runs through the process connection and opens into a pressure receiving chamber, which is provided upstream of the measuring membrane and sealed in a diffusion-tight manner and by which the pressure to be measured can be applied to the measuring membrane.

Preferred embodiments are characterized in that the tubular carrier region of the carrier, in a direction running parallel to the longitudinal axis to the measuring membrane, has a length that is greater than its wall thickness, and/or the tubular carrier region of the carrier has a wall thickness of 1 mm to 2 mm.

A second refinement is characterized in that the pressure sensor is designed as a free-standing pressure sensor, which is only attached by means of the joint connecting the edge of the end face of the pressure sensor to the carrier.

A third refinement is characterized in that the pressure measuring device comprises a housing, wherein the housing is mounted on the process connection, surrounds the carrier, the pressure sensor and measuring electronics connected to the pressure sensor, and is spaced apart from the carrier and from the pressure sensor.

Further refinements are characterized in that an end face of the end region of the carrier which faces the process connection is connected directly to the process connection by means of a joint, or the end region of the carrier which faces the process connection is connected to the process connection in a diffusion-tight manner by means of at least one interposed further component arranged in a direction running parallel to the surface normal to the measuring membrane between the carrier and the process connection.

Further embodiments are characterized in that the process connection is made of a stainless steel and/or that the measuring membrane and/or main body of the pressure sensor are each made of an oxide ceramic or of aluminum oxide ($Al_2O_3$).

A further development is characterized in that the joint connecting the pressure sensor to the carrier is designed as a joint produced by means of a hard solder, wherein the hard solder is free of active components that can be used for active brazing, and wherein the joint is designed as a joint produced by means of a joining method, in which:
  a) an arrangement is produced in which the joining surfaces of the carrier and the pressure sensor rest on one another by means of the interposed hard solder, and
  b) the arrangement is heated to a joining temperature at which the hard solder is melted, and a portion of the titanium contained in the carrier diffuses through the melted hard solder, which is in contact with the carrier, to the ceramic of the pressure sensor and reacts there with the ceramic in such a way that a chemical compound comprising titanium is formed.

A refinement of the latter refinements is characterized in that the joint between the pressure sensor and the carrier is a joint produced by means of a hard solder comprising silver and copper, a hard solder comprising only silver and copper, a hard solder comprising silver, copper and another non-active component, a silver copper indium hard solder or a silver copper tin hard solder.

Further refinements are characterized in that the carrier is connected to the process connection or a component made of stainless steel arranged between the carrier and the process connection, either by means of a joint designed as a welded joint or by means of a joint produced by means of a hard solder, wherein the hard solder used to produce this joint either:
  a) is identical to the hard solder used to produce the joint connecting the pressure sensor to the carrier, or at least has a melting temperature that is substantially identical to the melting temperature of the hard solder used to produce the joint connecting the pressure sensor to the carrier, or
  b) has a melting temperature that is lower than a melting temperature of the hard solder used to produce the joint connecting the pressure sensor to the carrier, and/or is a copper silver hard solder that has a higher copper content and a lower silver content than the hard solder comprising copper and silver which is used to produce the joint between the pressure sensor and the carrier.

The invention further comprises a method for producing a pressure measuring device, which is characterized in that the pressure sensor, the carrier and the process connection are provided as prefabricated individual parts, the pressure sensor is connected to the carrier by carrying out a joining method, by means of which the joint connecting the pressure sensor to the carrier is produced, and the carrier is mounted on the process connection.

A refinement of this method is characterized in that the joint connecting the pressure sensor to the carrier is produced by means of a hard solder that is free of active components usable for active brazing, by carrying out a joining method in which:
  a) an arrangement is produced in which the joining surfaces of the carrier and the pressure sensor rest on one another by means of the interposed hard solder, and
  b) the arrangement is heated to a joining temperature at which the hard solder is melted, and a portion of the titanium contained in the carrier diffuses through the melted hard solder, which is in contact with the carrier, to the ceramic of the pressure sensor and reacts there with the ceramic in such a way that a chemical compound comprising titanium is formed.

BRIEF DESCRIPTION OF THE DRAWINGS

The invention and its advantages will now be explained in detail using the figures in the drawing which show two exemplary embodiments. The same elements are indicated by the same reference numbers in the figures. In order to be able to show components having very different dimensions, an illustration that is not always true-to-scale was chosen.

DETAILED DESCRIPTION

Figure 1:
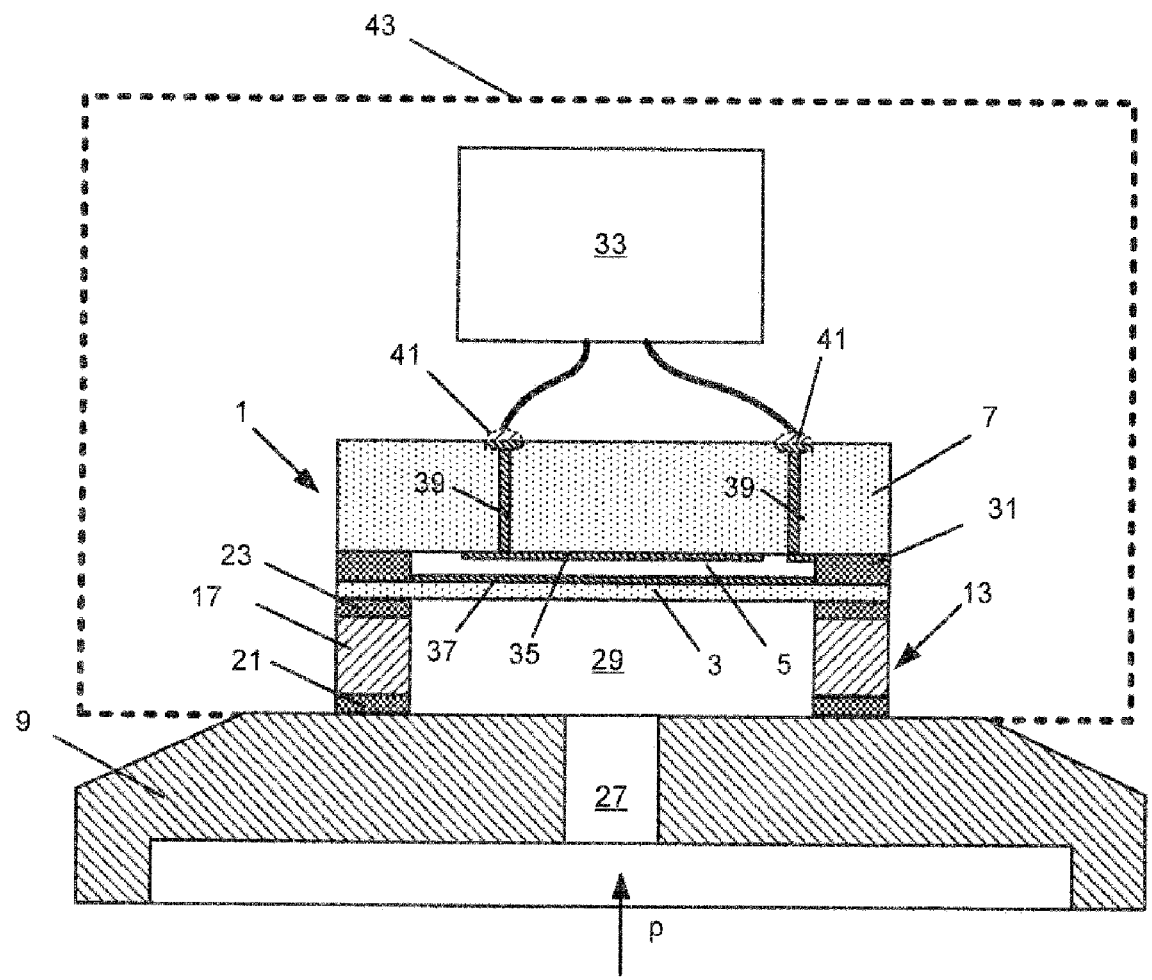
FIG. 1 shows: an example of a pressure measuring device.
Figure 2:
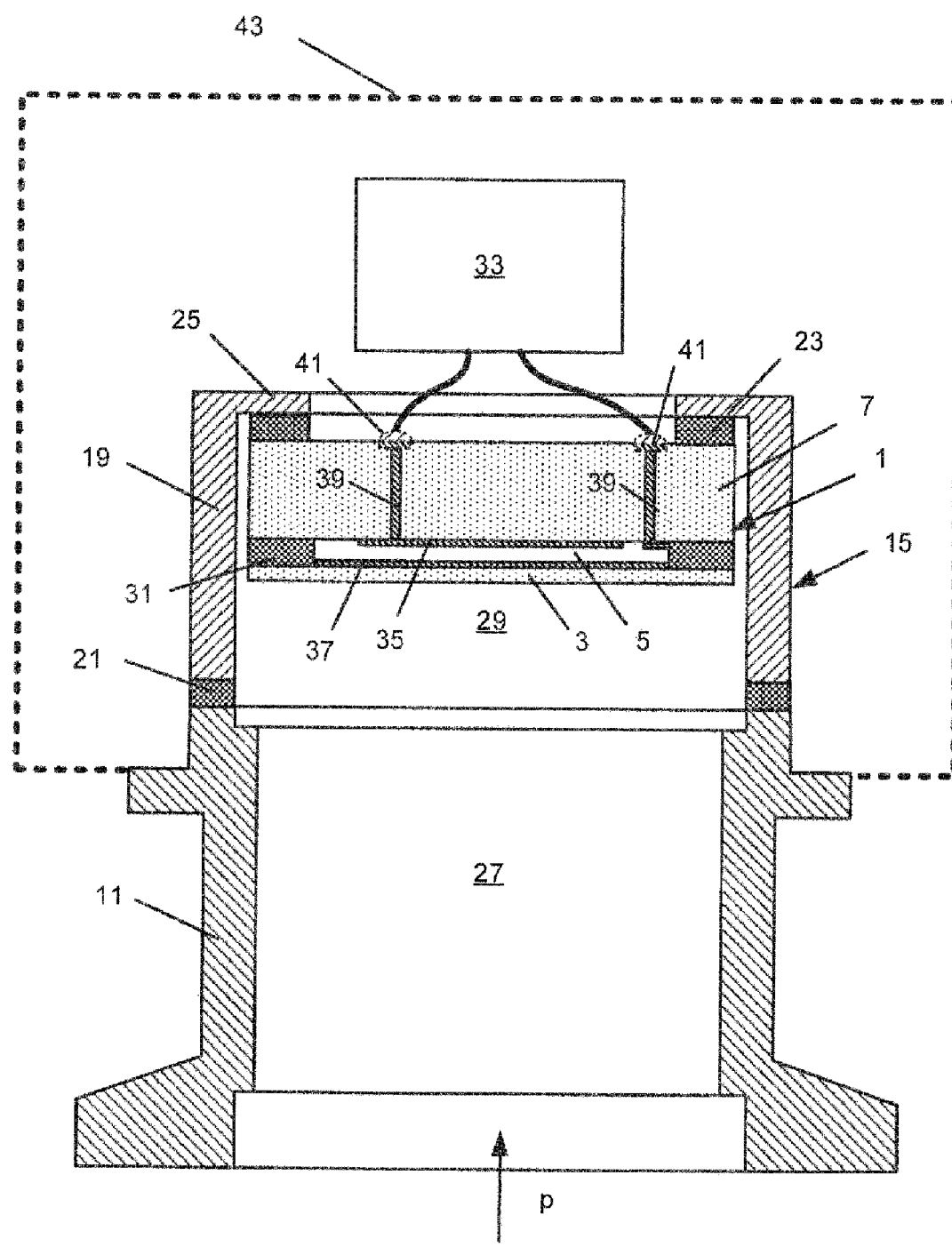
FIG. 2 shows: a further example of a pressure measuring device.

FIGS. 1 and 2 each show an example of a pressure measuring device according to the invention. These each comprise a ceramic pressure sensor 1, which comprises a measuring membrane 3. In the pressure sensors 1 shown here by way of example, the measuring membrane 3 is connected to a main body 7 of the pressure sensor 1, enclosing a pressure chamber 5. The pressure sensor 1 is attached in the respective pressure measuring device in such a way that a pressure p to be measured can be applied to its measuring membrane 3. In addition, the pressure measuring devices each comprise a process connection 9, 11 by means of which the pressure measuring device can be mounted on a connection complementary thereto and/or can be connected to a connection of a differential pressure line complementary thereto.

Pressure measuring devices according to the invention are characterized by comprising a carrier 13, 15 made of titanium, which comprises a free-standing tubular carrier region 17, 19 running parallel to the surface normal to the measuring membrane 3. This carrier 13, 15 comprises an end region which faces the process connection 9, 11 and is connected to the process connection 9, 11. In the pressure measuring devices shown here by way of example, an end face of the end region of the carrier 13, 15 which faces the process connection 9, 11 is connected directly to the process connection 9, 11 by means of a joint 21. Alternatively, the end region of the carrier 13, 15 facing the process connection 9, 11 can also be connected to the process connection 9, 11 in a diffusion-tight manner by means of at least one interposed further component, such as a connecting tube, arranged in a direction running parallel to the surface normal to the measuring membrane 3 between the carrier 13, 15 and the process connection 9, 11. Furthermore, the carrier 13, 15 comprises an end region facing away from the process connection 9, 11, to which the pressure sensor 1 is attached by means of a joint 23, which connects an outer edge of an end face of the pressure sensor 1 to the end region of the carrier 13, 15 facing away from the process connection 9, 11 and which carries the pressure sensor 1.

Pressure measuring devices according to the invention have the aforementioned advantages. Individual components of pressure measuring devices according to the invention can have different designs that can be used individually or in combination with one another. Examples in this regard are described below based on the figures.

FIG. 1 shows a variant of the invention in which the carrier 13 is designed as a tube which is arranged in a free-standing manner on the process connection 9 and comprises the tubular carrier region 17 and the end region of which located opposite the process connection 9 is connected by means of the joint 23 to an outer edge of the front end face of the pressure sensor 1 formed by the measuring membrane 3. This variant offers the advantage that, via the carrier 13, a sensor attachment acting substantially only parallel to the surface normal to the measuring membrane 3 on the outer edge of the measuring membrane 3 is provided, via which practically no forces acting on the measuring membrane 3 in the radial direction are transmitted to the measuring membrane 3.

FIG. 2 shows a variant of the invention in which the end region of the carrier 15 facing away from the process connection 11 has a shoulder 25 that, at the end, adjoins the tubular carrier region 19 and extends radially inwardly. In this variant, an outer edge of the rear end face of the pressure sensor 1 formed by the main body 7 is connected by means of the joint 23 to an inner edge region of the shoulder 25 which is spaced apart from the tubular support region 19. This variant offers the advantage that the measuring membrane 3 is completely exposed and is thus not subjected to forces exerted thereon directly by way of the sensor attachment. In addition, the measuring membrane 3 is protected here from thermomechanical stresses, possibly acting on the pressure sensor 1 via the shoulder 25 in the radial direction, by the main body 7 arranged between the measuring membrane 3 and the shoulder 25.

In pressure measuring devices according to the invention, the tubular carrier region 17, 19 of the carrier 13, 15, in a direction running parallel to the longitudinal axis to the measuring membrane 3, preferably has a length that is greater than its wall thickness. A comparatively large length offers the advantage that thermomechanical stresses attributable to the different coefficients of thermal expansion of the carrier 13, 15 and the process connection 9, 11 can be almost completely relieved across the entire length.

In the process, the carrier region 19 of the carrier 15 shown in FIG. 2, in a direction running parallel to the surface normal to the measuring membrane 3, preferably has a length that is greater than or equal to a structural height which the pressure sensor 1 has in a direction running parallel to the surface normal to the measuring membrane 3. This embodiment offers the advantage that the carrier region 19 can be mounted, at the end, directly on the process connection 11 by means of the joint 21, without a further interposed component, such as a metallic connecting tube.

Irrespective of the other shape of the carrier 13, 15, the tubular carrier region 17, 19 of pressure measuring devices according to the invention can, for example, have a wall thickness of 1 mm to 2 mm.

As an alternative or in addition to the aforementioned embodiments, the pressure sensor 1 is preferably designed as a free-standing pressure sensor 1, which is only attached by means of the joint 23 connecting the edge of the respective end face of the pressure sensor 1 to the carrier 13, 15. This embodiment illustrated in FIGS. 1 and 2 offers the advantage over pressure measuring devices comprising pressure sensors that are supported at the front and rear, or clamped in a clamping device, that no clamping forces are exerted on the pressure sensor 1, which could have a disadvantageous effect on the achievable measuring accuracy, and the magnitude of which could possibly change as a function of the temperature.

In pressure measuring devices according to the invention, the process connection 9, 11 is preferably made of stainless steel. In the process, the invention offers the advantage that standard process connections used in industrial measuring technology can readily be used as the process connection 9, 11. In particular process connections used in vacuum technology, such as process connections that comprise a small flange, which can be mounted on a complementary counter flange by means of a tension ring, interposing a seal, such as a small flange seal and/or a seal designed as a metallic seal, and/or which can be connected to a corresponding connection of a differential pressure line, are particularly suitable for measuring small pressures, such as, for example, pressures of less than or equal to one bar.

Regardless of the process connection type of the process connection 9, 11, the process connections 9, 11 each have a pressure transmission path 27 that runs through the respective process connection 9, 11 and opens into a pressure receiving chamber 29, which is provided upstream of the measuring membrane 3 and sealed in a diffusion-tight manner and by which the pressure p to be measured can be applied to the measuring membrane 3. In the exemplary embodiments shown here, the diffusion-tight sealing of the pressure receiving chamber 29 is effectuated by the joints 21, 23.

Ceramic pressure sensors 1 known from the prior art can be used in pressure measuring devices according to the invention. Pressure sensors 1, the main body 7 of which and/or the measuring membrane 3 of which is made of an oxide ceramic, such as aluminum oxide ($Al_2O_3$), are particularly suitable, the main body 7 and the measuring membrane 3 preferably being made of the same material. The aforementioned ceramics offer the advantage that their coefficients of thermal expansion are very similar to the coefficient of thermal expansion of the carrier 13, 15. In the process, the main body 7 and the measuring membrane 3 can be connected to one another, for example by means of a joint 31 which connects an outer edge of the measuring membrane 3 to an outer edge of the main body 7 and surrounds the pressure chamber 5 on the outside on all sides, for example an active brazing, such as active brazing produced by means of a zirconium nickel titanium active brazing solder.

Optionally, the pressure sensor 1 can be designed, for example, as an absolute pressure sensor, which measures a pressure p acting on an outer side of the measuring membrane 3. In this case, the pressure chamber 5 enclosed beneath the measuring membrane 3 is evacuated.

The pressure sensors 1 shown each comprise an electromechanical transducer which is designed to convert a deflection of the measuring membrane 3 dependent on the pressure p acting on the measuring membrane 3 into an electrical variable, based on which the pressure p to be measured can then be determined by means of measuring electronics 33 connectable or connected to the transducer. For this purpose, the capacitive transducer shown as an example in FIGS. 1 and 2 comprises a measuring capacitor having a measuring capacitance dependent on the pressure-dependent deflection of the measuring membrane 3, which comprises a measuring electrode 35 arranged on a membrane-facing end face of the main body 7 and a counter electrode 37 arranged on an inner side of the measuring membrane 3 facing the main body 7.

In the example shown here, the measuring electrode 35 is connected via a contact pin 39 running through the main body 7 to a connection 41, which is arranged on the end face the main body 7 facing away from the membrane and via which the measuring electrode 35 is connectable or connected to the measuring electronics 33. Via the abutting electrically conductive joint 31 and a contact pin 39 that is connected to the joint 31 in an electrically conducting manner and runs through the main body 7, the counter electrode 37 is connected to a connection 41 which is arranged on the end face of the main body 7 facing away from the membrane and via which the counter electrode 37 can be connected or is connected to the measuring electronics 33.

Alternatively, instead of the pressure sensors 1 shown here, it is of course also possible to use other ceramic pressure sensors which are known from the prior art and comprise a measuring membrane. These sensors can, for example, have a different mechanical design, be electrically connectable in some other way, and/or comprise an electromechanical transducer operating according to a different transducer principle, such as an optical or piezoresistive transducer.

Pressure measuring devices according to the invention preferably comprise a housing 43, which is used to receive the measuring electronics 33. In particular a housing 43, which is shown only schematically in the figures by a dotted line and which is mounted on the process connection 9, 11, is suitable for this purpose. This housing 43 surrounds the carrier 13, 15, the pressure sensor 1 and the measuring electronics 33 connected to the pressure sensor 1, and is preferably spaced apart from both the carrier 13, 15 and the pressure sensor 1.

In pressure measuring devices according to the invention, the joint 23 between the pressure sensor 1 and the carrier 13, 15 is preferably a joint 23 produced by means of a hard solder, the hard solder being free of active components which can be used for active brazing. This joint 23 is designed as a joint 23 that was produced by creating an arrangement in which the joining surfaces of the carrier 13, 15 and the pressure sensor 1 rest on one another by means of the interposed hard solder, and the arrangement is heated to a joining temperature at which the hard solder is melted, and a portion of the titanium contained in the carrier 13, 15 diffuses through the molten hard solder, which is in contact with the carrier 13, 15, to the ceramic of the pressure sensor 1 and reacts there with the ceramic in such a way that a chemical compound comprising titanium is formed.

Active brazing solder is deliberately not used in the process, although it is known that active components contained in active brazing solders promote the wetting of the ceramic and bring about the formation of a mechanically high-strength chemical compound. This procedure offers the advantage that the soldering process can be controlled much more easily and better than is the case with the use of active brazing solders. In addition, the melted hard solder has markedly better flow properties compared to alternatively usable active brazing solders. Both ultimately result in high-quality joints 23 with high compressive strength and high tightness. A helium leak tightness of the joint 23, which is usually stated in the form of a helium leakage rate, of less than or equal to $5*10^{-10}$ mbar l/s can be achieved in the process.

Suitable hard solders in this respect are, in particular, the hard solders comprising silver and copper described in the German patent application DE 102018108744.6, which is still unpublished and was filed on Apr. 12, 2018. Examples of these are hard solders only comprising silver and copper, and silver copper hard solders comprising a further nonactive component, such as silver copper indium hard solders or silver copper tin hard solders.

A further advantage is that hard solders without an active component, such as the aforementioned hard solders comprising silver and copper, have a lower melting temperature than active brazing solders comprising an active component, such as active brazing solders comprising silver, copper and titanium. This offers the advantage that the joining process can be carried out at a joining temperature that is higher than or equal to the melting temperature of the hard solder, and that is lower than a melting temperature of an active brazing solder containing the components present in the hard solder and titanium as the active component. While a joining temperature above the melting temperature of the active brazing solder, in the range of 870° C. to 950° C., is required to produce an active brazing by means of an active brazing solder comprising silver, copper and titanium, a joining temperature above the melting temperature of the hard solder is already sufficient in conjunction with the aforementioned hard solders without an active component to allow the titanium of the carrier 13, 15 to diffuse through the melted hard solder. For this purpose, a joining temperature of less than or equal to 860° C., or in the range of 830° C. to 860° C., already suffices in conjunction with a silver copper hard solder. In conjunction with a silver copper indium hard solder, or a silver copper tin hard solder, even an even lower joining temperature can be used, depending on the proportionate composition of these hard solders.

The low joining temperature offers the advantage that it is lower than that for producing the joint 31, formed as an active brazing, between the measuring membrane 3 and the main body 7, so that the joint 23 between the carrier 13, 15 and the pressure sensor 1 can be produced without thereby impairing the quality of the joint 31, formed as active brazing and produced previously during production of the pressure sensor 1, between the measuring membrane 3 and the main body 7.

The lower joining temperature additionally offers the advantage that significantly lower thermomechanical stresses attributable to the joining process are formed between the pressure sensor 1 and the carrier 13, 15 than would be the case at higher joining temperatures. This makes it possible to reduce production-related stresses, which could otherwise lead to an increase in a temperature dependence of the pressure-dependent deformability of the measuring membrane 3, which in turn would result in a temperature-dependent measuring error.

The joint 21 between the carrier 13, 15 and the process connection 9, 11 made of stainless steel is preferably likewise a brazing produced by means of a hard solder, wherein a hard solder not containing an active component is also used here. For this purpose, a hard solder with a melting temperature lower than the melting temperature of the hard solder used to produce the joint 23 connecting the pressure sensor 1 to the carrier 13, 15 is preferably used. In particular a copper silver hard solder, which has a higher copper content and a lower silver content than the silver copper hard solder that can be used to produce the joint 23 between the pressure sensor 1 and the support 13, 15, is suitable for this purpose.

Analogously, the carrier 13, 15 of pressure measuring devices in which a further component made of stainless steel is arranged between the carrier 13, 15 and the process connection 9, 11 is preferably connected to the further component by means of brazing. A hard solder with a melting temperature lower than the melting temperature of the hard solder used to produce the joint 23 connecting the pressure sensor 1 to the carrier 13, 15 is preferably also used for this purpose. In particular a copper silver hard solder, which has a higher copper content and a lower silver content than the silver copper hard solder that can be used to produce the joint 23 between the pressure sensor 1 and the support 13, 15, is also suitable for this purpose.

Pressure measuring devices according to the invention are preferably produced in such a way that the pressure sensor 1, the carrier 13, 15 and the process connection 9, 11 are provided as prefabricated individual parts, the pressure sensor 1 is connected to the carrier 13, 15, and the carrier 13, 15 is mounted on the process connection 9, 11. In this case, the connection between the pressure sensor 1 and the carrier 13, 15 is produced by means of a joining method, such as the joining method described above, by means of which the joint 23 connecting the pressure sensor 1 to the carrier 13, 15 is produced.

In the process, the above-described embodiment, in which the hard solder used to produce the joint 23 between the pressure sensor 1 and the carrier 13, 15 has a higher melting temperature than the hard solder used to attach the carrier 13, 15 on the process connection 9, 11 or the component, has the advantage that a stepped brazing method can be used, in which the joint 21 between the carrier 13, 15 and the process connection 9, 11, or between the carrier 13, 15 and the component, is only carried out after the production of the joint 21 between the pressure sensor 1 and the carrier 13, 15. In this case, the carrier 13, 15 is consequently mounted together with the pressure sensor 1 carried by the carrier 13, 15 on the process connection 9, 11 or on the further component.

Alternatively, in order to produce the joint 21 between the carrier 13, 15 and the process connection 9, 11 or the further component, a hard solder can be used which is either identical to the hard solder used to produce the joint 23 connecting the pressure sensor 1 to the carrier 17, 19 or at least has a melting temperature that is substantially identical to the melting temperature of the hard solder used to produce the joint 23 connecting the pressure sensor 1 to the carrier 17, 19. In this respect, in particular the hard solders already mentioned above in connection with the joint 23 between the pressure sensor 1 and the carrier 17, 19 are suitable as hard solders. In this embodiment, the joint 23 between the pressure sensor 1 and the carrier 17, 19 as well as the joint 21 between the carrier 13, 15 and the process connection 9, 11 or between the carrier 13, 15 and the further component are preferably produced substantially simultaneously in a single soldering process.

A further alternative is to produce the joint 21 between the carrier 13, 15 and the process connection 9, 11 or the further component following the production of the joint 23 between the pressure sensor 1 and the carrier 13, 15 by means of welding.

In the case of pressure measuring devices which comprise the further component arranged between the carrier 13, 15 and the process connection 9, 11, the component can be attached on the process connection 9, 11 in a diffusion-tight manner, for example by means of a welded joint.

The invention claimed is:

1. A pressure measuring device, comprising:
    a ceramic pressure sensor including a measuring membrane having a surface normal, wherein the ceramic pressure sensor is structured to enable the measuring membrane to be subjected to a pressure to be measured;
    a process connection configured to enable the pressure measuring device to be mounted on a connection complementary thereto and/or to be connected to a connection of a differential pressure line complementary thereto; and
    a carrier including a free-standing, tubular support region running parallel to the surface normal of the measuring membrane, a first end region adjacent and connected to the process connection, and a second end region opposite the process connection to which the ceramic pressure sensor is attached via a first joint, which connects an outer edge of an end face of the ceramic pressure sensor to the second end region of the carrier and which supports the ceramic pressure sensor,
    wherein the carrier is made of titanium.

2. The pressure measuring device of claim 1, wherein the carrier is configured as a tube disposed in a free-standing manner on the process connection, which comprises the support region, an end region of which is the second end region of the carrier opposite the process connection and connected via the first joint to an outer edge of a front end face of the ceramic pressure sensor defined by the measuring membrane.

3. The pressure measuring device of claim 1, wherein:
    the measuring membrane is connected to a main body of the ceramic pressure sensor, thereby enclosing a pressure chamber;
    the second end region of the carrier includes a radially inwardly extending shoulder that, at its proximal end, adjoins the support region; and
    an outer edge of a rear end face of the ceramic pressure sensor defined by the main body is connected via the first joint to an inner edge region of an inner side of the shoulder, which faces the process connection, the inner edge region being spaced apart from the support region.

4. The pressure measuring device of claim 3, wherein in a direction parallel to the surface normal of the measuring membrane, the support region has a length that is greater than or equal to a structural height of the ceramic pressure sensor in the direction parallel to the surface normal of the measuring membrane.

5. The pressure measuring device of claim 3, wherein the process connection is made of a stainless steel, and/or
wherein the measuring membrane and/or the main body of the ceramic pressure sensor are both made of aluminum oxide ($Al_2O_3$) or of another oxide ceramic.

6. The pressure measuring device of claim 1, wherein the process connection includes a pressure transmission path extending through the process connection and opening into a pressure receiving chamber upstream of the measuring membrane and sealed in a diffusion-tight manner and by which the pressure to be measured is applied to the measuring membrane.

7. The pressure measuring device of claim 1, wherein the support region of the carrier, in a direction parallel to a longitudinal axis to the measuring membrane, has a length greater than its wall thickness, and/or the wall thickness of the support region of the carrier is 1 mm to 2 mm.

8. The pressure measuring device of claim 1, wherein the ceramic pressure sensor is configured as a free-standing pressure sensor, which is attached only via the first joint connecting the edge of the end face of the ceramic pressure sensor to the carrier.

9. The pressure measuring device of claim 1, further comprising a housing mounted on the process connection, which surrounds the carrier, the ceramic pressure sensor and measuring electronics connected to the ceramic pressure sensor, the housing is spaced apart from the carrier and from the ceramic pressure sensor.

10. The pressure measuring device of claim 1, wherein an end face of the first end region of the carrier is connected directly to the process connection via a second joint, or
wherein the first end region of the carrier is connected to the process connection in a diffusion-tight manner via at least one interposed further component arranged between the carrier and the process connection in a direction parallel to the surface normal to the measuring membrane.

11. The pressure measuring device of claim 1, wherein the first joint connecting the ceramic pressure sensor to the carrier is formed by a hard solder, wherein the hard solder is free of active components usable for active brazing, and wherein the first joint is formed by a joining method in which:
joining surfaces of the carrier and the ceramic pressure sensor seat against each other via the interposed hard solder; and
the hard solder is selected such that, when heated to a joining temperature at which the hard solder is melted, a portion of the titanium in the carrier diffuses through the melted hard solder, which is in contact with the carrier, to the ceramic of the ceramic pressure sensor and reacts with the ceramic such that a chemical compound comprising titanium is formed.

12. The pressure measuring device of claim 11, wherein the hard solder comprises:
silver and copper;
silver, copper and further, non-active component;
silver copper indium; or
tin silver copper, or
wherein the hard solder consists of silver and copper.

13. The pressure measuring device of claim 11, wherein the carrier is connected to the process connection, or a component made of stainless steel disposed between the carrier and the process connection, by a second joint configured as either a welded joint or as a hard solder joint, wherein the hard solder either:
is identical to the hard solder of the first joint connecting the ceramic pressure sensor to the carrier, or has a melting temperature substantially the same as a melting temperature of the hard solder of the first joint; or
has a melting temperature lower than a melting temperature of the hard solder of the first joint and/or is a copper silver hard solder having a relatively higher copper content and a relatively lower silver content than the hard solder of the first joint.

14. A method for producing a pressure measuring device according to claim 1, the method comprising:
providing the ceramic pressure sensor, the carrier and the process connection as prefabricated, individual parts;
connecting the ceramic pressure sensor to the carrier by performing a joining method by which the first joint connecting the ceramic pressure sensor to the carrier is formed; and
mounting the carrier on the process connection.

15. The method of claim 14, wherein the first joint is formed of a hard solder that is free of active components usable for active brazing, and
wherein the joining method includes:
providing an arrangement in which the joining surfaces of the carrier and the ceramic pressure sensor rest against each other via the hard solder therebetween; and
heating the arrangement to a joining temperature at which the hard solder is melted such that a portion of the titanium contained in the carrier diffuses through the melted hard solder to the ceramic of the ceramic pressure sensor and reacts there with the ceramic such that a chemical compound comprising titanium is formed.

\* \* \* \* \*